Nov. 22, 1966   P. GODET ETAL   3,287,385
PROCESS FOR SOAP MAKING
Filed April 25, 1963
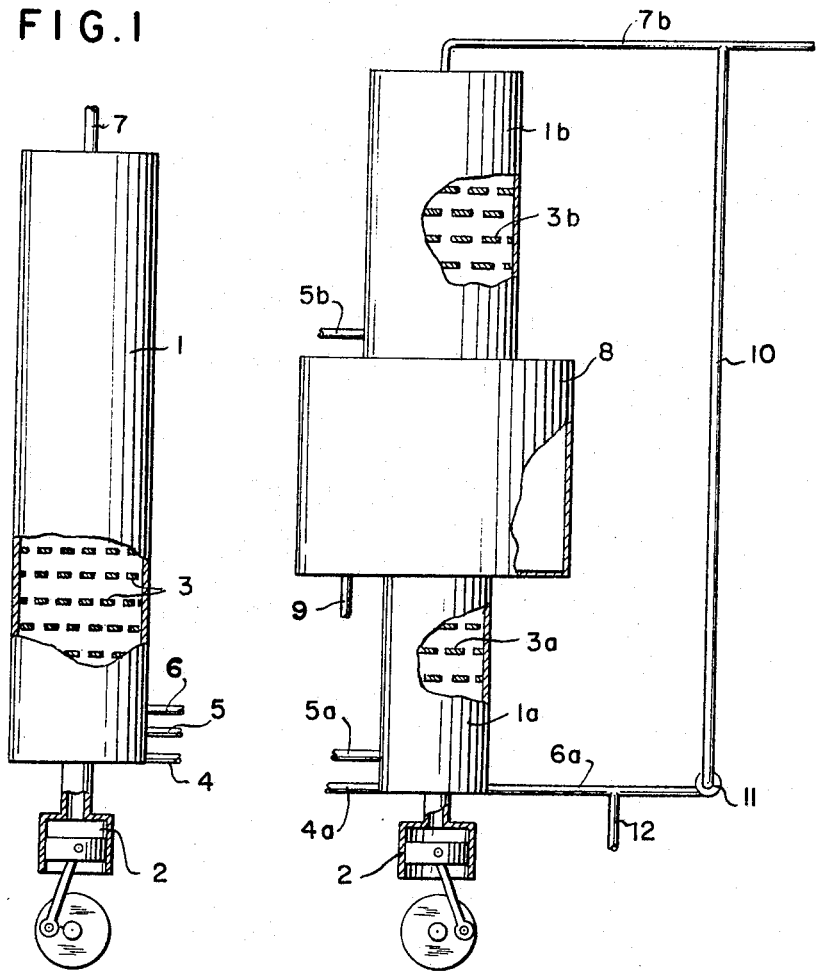
INVENTORS.
PIERRE GODET
JEAN-LOUIS JOUX
BY Ronald S. Cornell
ATTORNEY United States Patent Office 3,287,385
Patented Nov. 22, 1966

3,287,385
PROCESS FOR SOAP MAKING
Pierre Godet, L'Isle-Adam, and Jean-Louis Joux, Epinay-sur-Seine, France, assignors to Colgate-Palmolive Company
Filed Apr. 25, 1963, Ser. No. 275,748
Claims priority, application France, Apr. 27, 1962, 895,995
16 Claims. (Cl. 260—417)

The present invention deals with soap manufacture. This involves the reaction of fats and oils with caustic aqueous solutions and results in the production of soap and glycerine.

The essential chemical reaction involved in this process is saponification. The reagents, i.e. fatty materials and caustic aqueous solution, are not miscible per se. This immiscibility of the reagents involves not only their inability to come in contact, but also their tendency to separate as the reaction evolves, the soap partly formed coating the material not yet saponified thus further reducing contact with the caustic.

It is therefore not surprising to see that the processes of realizing this reaction, proposed by the various authors who have studied this problem, can all be summarized in the application of mechanical means to ensure the dispersion and the contact of the two non-miscible phases. Among these means can be mentioned: agitation through boiling, mechanical agitation through circulation by pumping, mechanical agitation by mixing in a crutcher fitted with arms and baffles, dispersion in a coloidal mill, etc.

The various agitation means previously recommended have the disadvantages of requiring a large expense of energy and of necessitating expensive and complicated equipment.

The subject invention is based on the discovery that fatty materials and caustic aqueous solution can react continuously one on the other, in a filled pulsated column, at one of the ends of which the reagents are introduced concurrently, the column operating under flooding conditions.

According to this invention, a process for producing soap by the reaction of fatty materials and caustic in an aqueous solution under agitation, comprises concurrently passing fatty materials and aqueous caustic solution through a reaction zone; pulsing the reaction mixture in the reaction zone, giving to the totality of the liquids present in the zone an alternative pulsation movement such that there are flooding conditions in the reaction zone, thereby effecting the reaction of the fatty material and the caustic; and collecting soap and glycerine lye at the end of said reaction zone.

Pulse or pulsated columns are well known. Their use has nevertheless been limited up to now to liquid-liquid extractions in which two non-miscible phases are dispersed and kept in contact to ensure between them the exchange of a third material. In these extraction operations, both phases, introduced at both ends of the column, are moving counter-currently; in addition, the column working conditions, especially for the pulsation, have been such that both phases can separate after having been in contact, so that they can reach the end of the column opposite to the one through which they were introduced. If these working conditions are not maintained, it results in the flooding of the column, and thus these processes can no longer function.

It was therefore surprising to discover that pulsated columns could be used, not merely for a simple exchange between non-miscible phases, but to ensure, according to the invention, a chemical reaction between these phases, by having these columns work contrarily to their normal conditions, that is to say by having both phases move concurrently and under flooding conditions.

The use of pulsated columns in soap manufacture has important advantages. The soap manufacture can be accomplished continuously. The column requires only a minimum of energy consumption, the pulsation being economical agitation means. Moreover, the use of pulsated columns enables one to solve side-problems of soap manufacture, such as glycerine lye neutralization.

In all the processes now used, to obtain a complete saponification, it is necessary to use an excess of alkali. This excess still finds its way after the soap washing, in the glycerine lye which must be neutralized. This represents both a caustic loss and a need for acid consumption to accomplish the neutralization. However, as can be seen below, it is now possible to neutralize the glycerine lye through the free acidity of the fats, by using such lye as the caustic aqueous solution.

The process according to the invention ensures, in ideal conditions, the dispersion and the intimate contact of the fats and of the caustic aqueous solution, and the flooding conditions avoid any phase separation as long as they move in the column. It is sufficient to ensure that the emulsion mixture will stay long enough in the column and will exit only after it reaches the desired degree of reaction.

Moreover, it is not necessary to keep a precise control on the reagents ratio, an excess of alkali being not a handicap to the realization of the process, as is the case with the processes previously used, as explained above.

In the present process, therefore, glycerine lyes containing an excess of caustic can be used as the caustic aqueous solution sent to the pulsated column. The excess of caustic is then neutralized by the free acidity of the fats naturally present or added. The invention thus covers alkaline glycerine lye neutralization as well as fatty material saponification.

It is even possible to obtain simultaneously in the same column, neutralization of the glycerine lye and saponification of the fat, as will be shown below.

Some products known to catalyze the saponification reaction, such as soap or fatty acids, can be added to the fats and caustic aqueous solution introduced in the column. The reagents are heated at any temperature convenient for the reaction, the temperature used being well known in the technique, a temperature between 40° and 90° C. giving good results generally. The reagents are heated on their way through the column because the reaction is exothermic. Hence it is not necessary to bring any additional heat, this being an important advantage. If the temperature in the column reaches the mixture boiling temperature under atmospheric pressure, a pressure high enough to avoid boiling is applied to the column.

The column can be pulsated by any appropriate means such as piston pump, pneumatic device or any other device which can impart the liquid present in the column an alternative motion towards one of its end and then to the other.

As indicated, the phase separation in the column is avoided by having the column work above the flooding limit, that is, by giving to the product in the column a minimum flow rate and a pulsating amplitude and a pulsating frequency high enough so that the aqueous phase cannot separate. This flooding limit could be determined theoretically but has been established here experimentally. In the examples shown below, some practical values for the different factors which enable the obtaining of flooding conditions will be given. It is obvious that for practical reasons, one may have to choose among an infinite number of combinations of these different values. For instance, for a given flow rate of the products in the column, the flooding can be obtained at a certain pulsation rate, or if it is desired to reduce the flow rate of the fluids, the pulsation can be increased, etc.

Practically, the average flow rate of the product mixture in the column can thus vary from 0.15 to 1.5 cm./sec. but preferably from 0.3 to 0.6 cm./sec., the pulsating frequency from 50 to 300 strokes per minute, but preferably from 100 to 200, and the amplitude, measured by the liquid displacement in the column under the effect of the pulsation, from 5 to 200 mm, but preferably from 15 to 100 mm.

To favor the intimate contact of the phases, the column is fitted with a filling which can be composed of perforated plates. Raschig rings, Berl saddles or any other usual devices.

There are no special requirements as regards the size of these filling devices resulting from their use in this process. They are not different from the ones usually accepted in the industrial practice for the construction of filled columns. For instance, if perforated plates are used, they can be built starting from the standardized perforated iron plates, with perforations having dimensions from 1 to 10 mm. The space between two plates may vary from two to 20 cm. while the dimensions of the rings or saddles may vary according to the dimensions of the column, from 6 to 50 mm. The diameter of the column depends, of course, on the production capacity required.

We shall describe below, as a reference to the attached drawing, given only as an illustration, two modes of equipment foreseen for the carrying out of the process according to the invention, this equipment being also covered by the invention.

In this drawing, FIGURES 1 and 2 represent these two modes of operation, schematically, in lateral view, with partial opening.

According to the mode of operation represented in FIG. 1, the apparatus is essentially composed of a column entirely pulsated with the help of a device 2, which is here a piston pump. Inside the column 1 a filling is present. This filling is here formed by a series of horizontal perforated plates 3 which are regularly spaced. At the bottom of the column are connected three admission pipes 4, 5, 6. Through the pipe 4 is introduced the material to be saponified and through the pipe 5 the caustic solution.

The material to be saponified may be for example tallow, grease, palm oil, cotton seed oil, coconut oil, palm kernel oil or any mixture of these; it is introduced in 4 and may, according to its origin, contain a certain amount of free fatty acid and/or soap, such products acting as reaction catalyst. It may not be desired to introduce a larger amount of these products, but if it is so desired, or if the material to be saponified does not contain any of these ingredients which act as catalyst, they can be introduced in 6 either under the form of fatty acid, or as soap, or as a mixture of both, or as a product partly or completely saponified coming from an external source, or recycled starting from a convenient point of the equipment.

At the top of the column there is an outlet pipe 7 through which the mixture of the components fed at the bottom of the column is evacuated after having reacted.

The apparatus functions as follows: the non-miscible phases introduced at the bototm of the column are dispersed and brought in intimate contact under the influence of the pulsation to which they are subject by the device 2. The contact between the phases is further improved through the plates 3 or any similar filling device. Any phase separation is avoided through the flooding rate imposed. The phase reaction thus takes place throughout the whole column with emission of heat, and the degree of desired reaction can be adjusted by the height of the column.

The column can work in two different ways:
(1) For the neutralization of the alkaline glycerine lyes obtained from a previous saponification.
(2) For the complete saponification of a fatty material.

In the first mode of operation, the alkaline glycerine lye is introduced in 5 as caustic aqueous solution. This lye is neutralized in column 1 by the free acidity of the fats and/or by partial saponification of these fats. In 7 a neutral lye and a fat are collected, the free acidity of which has been transformed, completely or not, into soap. This fat may be also partly saponified. The neutral lye is separated and the fat is sent back to the bottom of a similar column with a fresh caustic aqueous solution.

In the second mode of operation, the fat and a fresh caustic aqueous solution, in exces relative to stoichiometric proportions, are sent to the bottom of the column. In 7, a mixture of alkaline lye which can be treated as above, and of soap, is collected, i.e., the fatty material completely saponified.

Both modes of operation can be simultaneously carried out in equipment such as is shown in FIG. 2.

This last apparatus can be considered as being formed by the superposition of two columns 1a and 1b with a decantation zone 8 between them. The column 1a and 1b are, as the column 1 previously described, fitted with filling devices 3a and 3b respectively. A device 2 at the base of the column 1a ensures the pulsation rate wanted for both columns 1a and 1b.

On the other hand, the section of the decantation area 8 which is not fitted with filling, must be sufficient to ensure that the flow conditions in this area 8 should be below the flooding limit and permit the separation of the phases.

The column 1a is fed at its bottom by three inlet pipes 4a, 5a and 6a. The fat enters through the pipe 4a. The alkaline glycerine lye coming from a soap washing stage enters through 5a, and the catalyst (if desired), e.g. composed of soap or fatty acids, enters through 6a.

The column 1a is there to neutralize the alkalinity of the lye introduced in 5a. This column operates along the first mode of operation described above. At the top of the column 1a, in area 8, a mixture of neutralized glycerine lye and of fats possibly partly saponified is obtained. In the area 8, the section of which is wide enough so that the rate is under the flooding limit, this mixture separates. The glycerine aqueous phase settles at the lowest part of the area 8 from which it is extracted through pipe 9. The upper fatty phase goes in column 1b which operates along the second mode of operation mentioned above. When it arrives in column 1b, this fatty phase is put in contact with the alkaline aqueous solution introduced through the pipe 5b, and it is completely saponified by going up in column 1b.

At the outlet of this column, a mixture of soap and alkaline glycerine lye is evacuated through the pipe 7b and thereupon washed if so desired. This washing may be conducted according to known processes. However, a standard pulse column may also be used to wash the soap and alkaline glycerine lye. Indeed, such a column may be placed over column 1b of the instant invention and thus made homogeneous therewith. Whatever the washing process used, a purified soap and an alkaline glycerine lye are obtained, the latter being used to feed the pipe 5a.

A by-pass 10 is connected to the pipe 7b and feeds soap in pipe 6a through a pump 11. For feeding, if it is wanted, free fatty acids or soap into the pipe 6a, a pipe 12 may be used.

The following examples are further illustrative of the practice of this invention.

*Example 1*

A column designed according to FIG. 1, 44 cm. in diameter and 3.1 meters high and having filling which is composed of 42 perforated plates having 5,000 holes of 3 mm. diameter, is pulsated at the rate of 160 strokes a minute with a piston pulsator, the displacement volume of which is 3 liters.

This column is intended to carry out a complete saponification of one ton per hour of a mixture of 40% tallow, 12% coconut oil, 36% of grease and 12% rosin, introduced at the bottom of the column at 55° C.

The bottom of the column is also fed with 0.3 ton per hour of a caustic soda solution, the concentration of which is 50% NaOH and the temperature of which is 45° C.

When the reaction products reach the top of the column, 0.25 ton per hour of the saponified mixture is recycled from the top of the bottom of the column.

When equilibrium is reached, 1.3 tons per hour of a completely saponified mixture is collected at the top of the column, and has a total fatty acid content of 73%.

A pressure of 1 kg./sq. cm. above the atmospheric pressure is maintained at the top of the column.

*Example 2*

The column built according to FIG. 1 and being 62 cm. in diameter and 3 meters high, the filling of which is composed of Raschig ring of 12.7 mm., is pulsated at the rate of 140 strokes per minute with a piston pulsator, the displacement volume of which is 18 liters.

This column completely neutralizes glycerine lyes containing 3% caustic soda. Such lyes are fed at the bottom of the column at the rate of 1 ton per hour. Two tons an hour of palm oil, the free acidity of which is 5% and 0.5 ton an hour of sodium soap are also introduced into the bottom of the column. All these materials are introduced at a temperature of about 80° C.

After separation of the product collected at the top of the column, a completely neutral lye is obtained as the lower layer. Atmospheric pressure is employed.

*Example 3*

Equipment such as that which is shown in FIG. 2 is composed of:

A column 62 cm. in diameter and 3.5 meters high, provided with 65 perforated plates having 3,000 holes of 5 mm. in diameter;

A decanter or separator, 95 cm. in diameter and 1.5 meters high without any filling;

A second column 69 cm. in diameter and 3 meters high, provided with 58 perforated plates having 3,250 holes, 5 mm. in diameter.

The whole is pulsated at the rate of 180 strokes per minute with a piston pulsator the displacement volume of which is 9.5 liters.

This apparatus saponifies 2 tons per hour of a mixture of refined fatty materials at 0.2% acidity, composed of 60% tallow, 20% palm oil and 20% palm kernel oil, and neutralizes 2 tons per hour of glycerine lye containing 5% caustic soda obtained by washing the soap produced in the equipment.

The mixture of fatty materials to be saponified and the lye to be neutralized are introduced at a temperature of 60° C. at the bottom of the first column together with one tone an hour of soap withdrawn at the outlet of the second column.

1.5 tons an hour of neutral glycerine lyes are collected in the separator while the partly saponified mixture receives at the bottom of the second column, 0.6 ton an hour of caustic soda (50% concentration) introduced at a temperature of 50° C. 3.1 tons an hour of completely saponified soap containing 61% total fatty acids are obtained at the outlet of this equipment which operates at atmospheric pressure.

It is to be understood that the invention is not limited to the specific embodiments described above. Various modifications can be made in the process and in the apparatus without departing from the spirit or scope of the invention.

Having now described my invention what we claim as new and desire to secure by Letters Patent is:

1. A process for producing soap and glycerine lye by the reaction of fatty materials and caustic in an aqueous solution under agitation, which comprises concurrently passing fatty materials and aqueous caustic solution through a reaction zone; pulsing the reaction mixture in the reaction zone, giving to the totality of the liquids present in the zone an alternative pulsation movement such that there are flooding conditions in the reaction zone, thereby effecting the reaction of the fatty material and the caustic; and collecting soap and glycerine lye at the end of said reaction zone.

2. A process as claimed in claim 1, wherein the introduction of fatty materials and caustic solution, the collection of soap and glycerine lye and the pulsing are all effected continuously.

3. A process as claimed in claim 2, wherein the reaction zone is a vertically oriented columnar zone through which the fatty materials and the caustic are passed.

4. A process as claimed in claim 3, wherein reductions in the cross-sectional areas of the reaction mixture are provided by vertically spaced flow constriction zones providing substantial flow obstructions with widely distributed open areas for fluid passage substantially smaller than the total cross-sectional area of said reaction zone.

5. A process as claimed in claim 3, wherein the caustic aqueous solution introduced in the column is an alkaline glycerine lye resulting from the washing of the soap and alkaline glycerine lye reaction products previously obtained.

6. A process as claimed in claim 3, wherein neutral glycerine lye and fatty materials are collected.

7. A process as claimed in claim 3, wherein the caustic aqueous solution introduced in the column is in excess, stoichiometrically to that required for fatty material saponification, and in which completely saponified fatty materials and alkaline glycerine lye are collected.

8. A process as claimed in claim 1, wherein the reaction zone is divided into two sections, separated by a middle decantation section of such width that it is below the flooding limit which is the condition of said two sections.

9. A process as claimed in claim 8, wherein fatty material and alkaline glycerine lye are initially introduced into the first section, said lye being neutralized thereby, the fatty materials and neutralized glycerine lye are then introduced into the decantation section where said fatty materials and neutralized glycerine lye are separated, the fatty materials are then introduced into the second section along with fresh caustic aqueous solution, and completely saponified fatty material plus alkaline glycerine lye are collected at the end of said second section.

10. A process as claimed in claim 8, wherein soap or fatty acids are introduced as catalysts along with fatty material.

11. A process as claimed in claim 1, wherein the amplitude of the pulsation measured by the displacement given to the liquids contained in the reaction zone is from 5 to 200 mm.

12. A process as claimed in claim 11, wherein the amplitude of the pulsation is from 15 to 100 mm.

13. A process as claimed in claim 11, in which, to obtain the flooding of the reaction zone, the liquids therein are circulated at a speed of from 0.15 to 1.5 cm./second.

14. A process as claimed in claim 13, wherein the liquids are circulated at a speed of from 0.3 to 0.6 cm./second.

15. A process as claimed in claim 11, wherein the frequency of pulsation is from 50 to 300 pulses per minute.

16. A process as claimed in claim 15, wherein the frequency of pulsation is from 100 to 200 pulses per minute.

References Cited by the Examiner

UNITED STATES PATENTS

| | | | |
|---|---|---|---|
| 127,827 | 6/1872 | Babbitt | 260—417 |
| 1,780,853 | 11/1930 | Walsh | 259—98 |

CHARLES B. PARKER, *Primary Examiner.*

A. H. SUTTO, *Examiner.*